US012559094B2

(12) United States Patent
Bruno et al.

(10) Patent No.: US 12,559,094 B2
(45) Date of Patent: Feb. 24, 2026

(54) METHOD FOR AVOIDING OBSTACLES

(71) Applicant: RENAULT S.A.S, Boulogne Billancourt (FR)

(72) Inventors: Geoffrey Bruno, Issy les Moulineaux (FR); Anh-Lam Do, Antony (FR); Marouane Lehim, Chaville (FR)

(73) Assignee: AMPERE S.A.S., Boulogne Billancourt (FR)

( * ) Notice: Subject to any disclaimer, the term of this patent is extended or adjusted under 35 U.S.C. 154(b) by 171 days.

(21) Appl. No.: 18/547,081

(22) PCT Filed: Feb. 3, 2022

(86) PCT No.: PCT/EP2022/052617
§ 371 (c)(1),
(2) Date: Aug. 18, 2023

(87) PCT Pub. No.: WO2022/175103
PCT Pub. Date: Aug. 25, 2022

(65) Prior Publication Data
US 2024/0149871 A1 May 9, 2024

(30) Foreign Application Priority Data
Feb. 19, 2021 (FR) ...................................... 21 01650

(51) Int. Cl.
*B60W 30/09* (2012.01)
*B60W 30/095* (2012.01)
(52) U.S. Cl.
CPC .......... *B60W 30/09* (2013.01); *B60W 30/095* (2013.01); *B60W 2554/80* (2020.02)
(58) Field of Classification Search
CPC ............... B60W 30/09; B60W 30/095; B60W 2554/80; B60W 2554/406; B60Y 2300/09; B60Y 2300/095
See application file for complete search history.

(56) References Cited

U.S. PATENT DOCUMENTS

| | | |
|---|---|---|
| 2014/0005908 A1 | 1/2014 | Kollberg et al. |
| 2017/0269602 A1* | 9/2017 | Nakamura ......... G01C 21/3492 |

(Continued)

FOREIGN PATENT DOCUMENTS

| | | |
|---|---|---|
| EP | 2 658 763 A1 | 11/2013 |
| FR | 2 787 586 A1 | 6/2000 |

(Continued)

OTHER PUBLICATIONS

Gonner, Steffen, et al. "Vehicle recognition and TTC estimation at night based on spotlight pairing." 2009 12th International IEEE Conference on Intelligent Transportation Systems. IEEE, 2009. (Year: 2009).*

(Continued)

*Primary Examiner* — Russell Frejd
*Assistant Examiner* — Ana D Thomas
(74) *Attorney, Agent, or Firm* — Oblon, McClelland, Maier & Neustadt, L.L.P.

(57) ABSTRACT

A method for object avoidance by a motor vehicle includes: detecting objects located in the surroundings of the motor vehicle; acquiring data characterizing the position and/or dynamics of each object, then, if several objects have been detected; verifying whether at least one criterion of proximity between at least two of the detected objects is met and, if so; combining the two objects into one group; calculating the data characterizing the position and/or dynamics of the group; and activating a system for obstacle avoidance and/or determining an avoidance trajectory, according to the data characterizing the position and/or dynamics of the group.

10 Claims, 6 Drawing Sheets

(56) References Cited

U.S. PATENT DOCUMENTS

| | | | |
|---|---|---|---|
| 2017/0287186 A1* | 10/2017 | Saito ........................ | G06T 11/60 |
| 2020/0139959 A1* | 5/2020 | Akella ................. | G05D 1/0088 |

FOREIGN PATENT DOCUMENTS

| | | | |
|---|---|---|---|
| FR | 3 098 172 A1 | 1/2021 | |
| WO | WO 2020/260144 A1 | 12/2020 | |

OTHER PUBLICATIONS

International Search Report issued Mar. 14, 2022 in PCT/EP2022/052617, filed on Feb. 3, 2022, 2 pages.

French Preliminary Search Report issued Nov. 7, 2021 in FR Application 21 01650, filed on Feb. 19, 2021, 3 pages (with English Translation of Categories of Cited Documents).

\* cited by examiner $Gap_{Right\_1} \geq 0$ $Gap_{Left\_2} \geq 0$ $Gap_{Right\_2} < 0$
$Gap_{Left\_3} < 0$
$Gap_{Right\_3} < 0$
$Gap_{Left\_4} < 0$
$Gap_{Right\_4} \geq 0$ $Gap_{Right\_1} > 0$ $Gap_{Left\_2} > 0$ $TTC_2 - TTC_3 > Sx$

METHOD FOR AVOIDING OBSTACLES

TECHNICAL FIELD OF THE INVENTION

The present invention relates in general to motor vehicle driving aids.

It relates more particularly to a method for avoiding obstacles.

The invention also relates to a motor vehicle equipped with a computer designed to implement this method.

PRIOR ART

With the aim of increasing the safety of motor vehicles, these are nowadays equipped with driving assistance systems or with autonomous driving systems.

These systems are known to include in particular automatic emergency braking (AEB) systems, designed to avoid any collision with obstacles located in the lane being traveled in by the vehicle, by simply acting on the conventional braking system of the motor vehicle.

However, there are some situations in which these emergency braking systems do not make it possible to avoid the collision or are not able to be used (for example if another vehicle is tailgating the motor vehicle).

For these situations, advanced evasive steering or automatic emergency steering (AES) systems have been developed, these making it possible to avoid the obstacle by deflecting the vehicle from its trajectory, by acting on the steering of the vehicle.

In order for this AES function to be effective, it is necessary to reliably detect the portion of the surroundings of the motor vehicle that is relevant to computing an optimum avoidance trajectory.

One parameter that is generally used for this purpose is called time to collision (TTC). A second parameter is formed by the deviation to be taken to pass alongside the detected obstacle without hitting it. Each potential obstacle is thus considered in isolation in order to determine the most hazardous one of them and to deduce an optimum avoidance trajectory therefrom.

However, it turns out that, by relying on these parameters, the AES obstacle avoidance function is activated in autonomous mode (without action from the driver) in some hazardous situations in which it would be preferable to leave the driver to carry out the avoidance. It is also the case that it does not activate due to an excessively large number of obstacles to be avoided in the same area, thereby making the function relatively unavailable.

PRESENTATION OF THE INVENTION

In order to rectify the abovementioned drawbacks from the prior art, the present invention proposes to process the detected objects not independently, but by grouping them together when possible.

More particularly, what is proposed according to the invention is a method for avoiding objects for a motor vehicle, which objects are initially considered to be potential obstacles. This method comprises steps of:

detecting objects located in the surroundings of the motor vehicle, acquiring data characterizing the position and/or the dynamics of each detected object, and then, if multiple objects have been detected, checking whether at least one criterion of proximity between at least two of the detected objects is met, and if so, combining the two objects into a group, computing data characterizing the position and/or the dynamics of said group, and activating an obstacle avoidance system and/or determining an avoidance trajectory according to the data characterizing the position and/or the dynamics of said group.

The method for grouping targets has numerous advantages.

The main advantage is that it means that the AES function may be activated in a larger number of situations than it is as a general rule.

Indeed, in the presence of an excessively large number of objects to be processed, provision is generally made to leave the AES function inactive whereas in this case, with the objects being grouped, it is possible to process a large number of separate objects.

In the same way, when the vehicle is traveling on a two-lane road and one or more objects are located in each lane, provision is generally made not to allow the activation of the AES function. By contrast, in the present invention, consideration is given only to the deviation between the various objects or groups of objects in order to check whether it is possible to activate the AES function.

Moreover, provision is generally made to detect the traffic lane in which each object is located before activating the AES function. When an object is located straddling two traffic lanes, the gap for passing alongside this object is more limited than if the object were centered in its lane. A large safety margin is therefore generally considered before activating the AES function. By contrast, in the present invention, each group of targets defines an area to be avoided, the position of which does not depend on that of the traffic lanes. It is thus possible to limit the safety margins to be considered, thereby making it possible to activate the AES function in a larger number of situations.

More generally, this method makes it possible to ignore the concept of traffic lanes when computing the avoidance trajectory, preferring to manage the surroundings as a single space in which the objects move.

It will also be noted that the invention makes it possible to simplify the computations.

It then makes it possible to manage a larger number of targets at the same time, this proving particularly beneficial in the case where a peloton of cyclists is detected.

It will also be noted that it ignores the class of the detected objects (cyclists, motor vehicles, etc.), preferring to group the objects of any class according to only one or more proximity criteria.

Other advantageous and non-limiting features of the method according to the invention, taken individually or in any technically possible combination, are as follows:

the data characterizing the position and/or the dynamics of said group are computed on the basis of the data individually characterizing the objects of the group;

next, these data individually characterizing the objects of the group are no longer considered: the obstacle avoidance system is activated and/or the avoidance trajectory is determined specifically independently of the data individually characterizing the objects of the group;

the proximity criterion relates to the lateral distance between the two objects (along an axis orthogonal to the tangent to the road at the level of the objects);

in the acquisition step, one of the data is a lateral trajectory deviation that the motor vehicle has to take in order to avoid each object;

the proximity criterion consists in checking whether the difference between the lateral trajectory deviation to be taken to avoid a first of the two objects on the side oriented toward the second object, on the one hand, and the lateral trajectory deviation to be taken to avoid the second object on the side oriented toward the first object, on the other hand, is greater than or equal to a predetermined threshold;

this threshold is greater than or equal to 0;

if at least three objects have been detected, provision is made to rank the objects in an order of succession from one edge of the road to the other, and it is then checked whether the proximity criterion is met between each pair of successive objects in said order of succession;

provision is made to compute a relative lateral speed on the basis of the deviation between the lateral speed of the motor vehicle with respect to the road on which the vehicle is traveling in a first reference frame oriented along a tangent to the road at the level of the motor vehicle, on the one hand, and the lateral speed of the object with respect to the road in a second reference frame oriented along a tangent to the road at the level of said object, on the other hand, and then each lateral trajectory deviation is determined on the basis of the relative lateral speed;

said proximity criterion relates to the longitudinal distance between the two objects;

in the acquisition step, one of the data relates to the remaining time before the motor vehicle hits each object;

to check that said proximity criterion is met, it is checked whether the deviation between the times to collision with the two objects is less than a threshold;

this threshold is greater than or equal to 0;

in the acquisition step, one of the data is a lateral trajectory deviation to be taken to avoid each object on one and the same left or right side, and in the computing step, one of the data characterizing the group is chosen to be equal to the largest of the lateral trajectory deviations to be taken to avoid the objects of the group on one and the same side;

in the acquisition step, one of the data characterizing each object is a remaining time before the motor vehicle hits each object, and in the computing step, one of the data characterizing the group is chosen to be equal to the smallest of the remaining times before the motor vehicle hits one of the objects of the group.

The invention also relates to a motor vehicle comprising at least one steered wheel, a steering system for each steered wheel designed to be maneuvered by an actuator controlled by a computer, which computer is designed to implement a trigger method as described above.

Of course, the various features, variants and embodiments of the invention may be combined with one another in various combinations provided that these are not incompatible or mutually exclusive.

DETAILED DESCRIPTION OF THE INVENTION

The following description with reference to the appended drawings, which are given by way of non-limiting example, will give a good understanding of the content of the invention and how the invention may be implemented.

Figure 1:
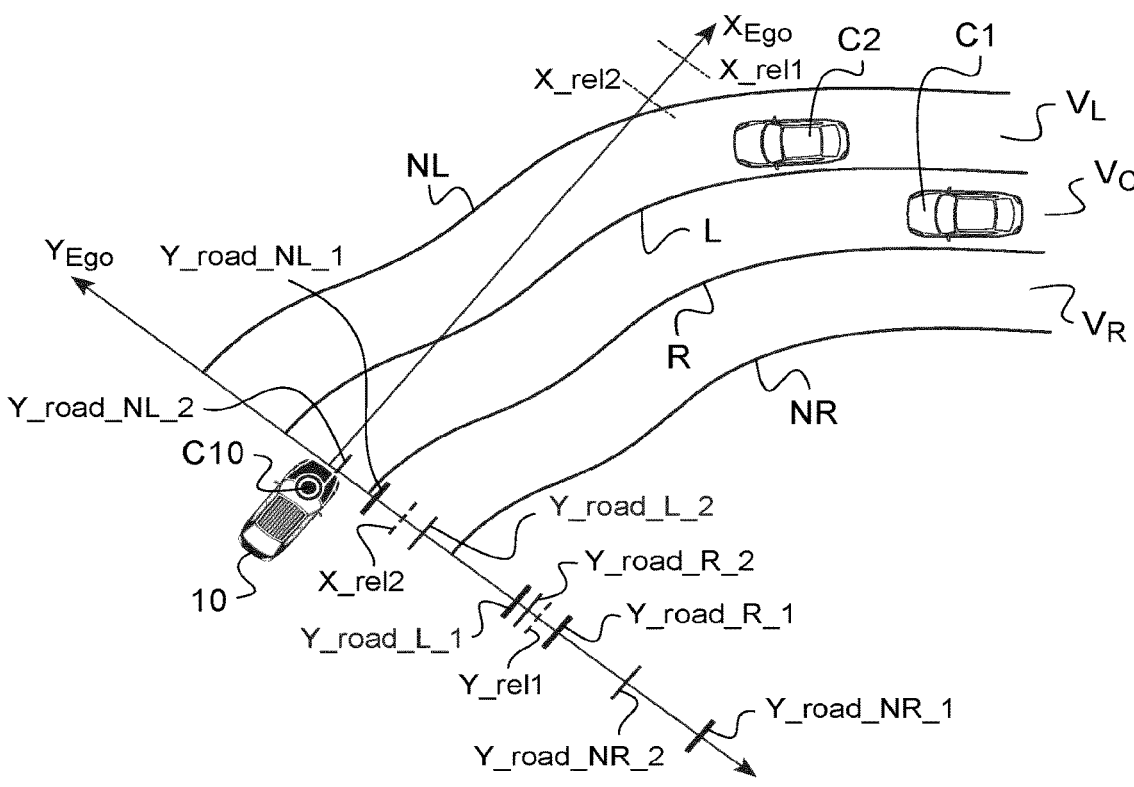
FIG. 1 is a schematic view of a motor vehicle according to the invention and of two target cars traveling in two separate traffic lanes.

FIG. 1 shows a motor vehicle 10 traveling on a road on which there are two "objects" forming potential obstacles for the motor vehicle 10. In this case, these two objects are formed by cars C1, C2. As a variant, they could be other types of objects (pedestrians, cyclists, etc.). The objects under consideration are preferably moving.

In the remainder of the description, the motor vehicle is the one that will implement the present invention, and it will be called "ego vehicle 10".

This ego vehicle 10 conventionally comprises a chassis that delimits a passenger compartment, wheels, at least two of which are steered wheels, a drivetrain, a braking system and a conventional steering system for acting on the orientation of the steered wheels.

In the example under consideration, the steering system is controlled by an assisted steering actuator that makes it possible to act on the orientation of the steered wheels on the basis of the orientation of the steering wheel and/or, as the case may be, on the basis of an instruction issued by a computer C10.

The computer C10 comprises at least one processor, at least one memory and various input and output interfaces.

By virtue of its input interfaces, the computer C10 is able to receive input signals from various sensors.

Among these sensors, provision is made for example for:

a device such as a frontal camera, for identifying the position of the ego vehicle with respect to its traffic lane, a device such as a radar or lidar remote detector, for detecting an obstacle located on the trajectory of the ego vehicle 10, at least one lateral device such as a radar or lidar remote detector, for observing the surroundings to the sides of the ego vehicle.

The computer C10 thus receives data relating to objects present in the surroundings of the ego vehicle 10 from multiple sensors. Conventionally, these data are combined with one another so as to provide reliable fused data about each object.

By virtue of its output interfaces, the computer C10 is able to transmit an instruction to the assisted steering actuator.

It thus makes it possible to ensure that the vehicle follows an obstacle avoidance trajectory as best possible and if the conditions allow this.

By virtue of its memory, the computer C10 stores data used as part of the method described below.

It stores in particular a computer application, consisting of computer programs comprising instructions the execution of which by the processor allows the computer to implement the method described below.

These programs comprise in particular an "AES system" that is designed to compute an obstacle avoidance trajectory and to control the ego vehicle 10 such that it follows this trajectory or to assist the driver with controlling the ego vehicle 10 such that it follows this trajectory. The AES system has an autonomous mode in which the trajectory is followed without the assistance of the driver, and a manual mode in which the AES system assists the driver with avoiding the obstacle and in which the driver remains in control of the maneuver.

Since this AES system is well known to those skilled in the art, it will not be described in detail here.

The computer programs also comprise activation software for activating the AES system, which will make it possible to determine whether the AES system should be activated (taking into account the trajectory of the ego vehicle and those of the objects present in its surroundings) and to wait for the best moment to activate it. It is this activation software that is more specifically the subject of the present invention here.

This software is active as soon as the ego vehicle 10 is moving.

It is implemented in a loop, at regular time increments.

It comprises a preliminary step of acquiring data relating to the ego vehicle 10 and to its surroundings, followed by nine main steps. These successive steps may then be described one by one.

In the preliminary step, the computer C10 receives at least one image acquired by the frontal camera of the ego vehicle 10. It furthermore receives data from the remote detectors. These images and data are then fused.

At this stage, the computer C10 therefore possesses an image of the road situated ahead of the ego vehicle 10 and fused data that characterize in particular each object detected and situated in the surroundings of the ego vehicle 10. These surroundings are considered here to be the area situated around the ego vehicle, wherein the sensors of the vehicle are designed to acquire data.

In the example of FIG. 1, the ego vehicle is traveling in a central traffic lane $V_C$, on either side of which there are two other traffic lanes $V_R$, $V_L$.

The computer C10 then seeks to determine the positions and shapes of the boundary lines NL, L, R, NL of these traffic lanes $V_C$, $V_R$, $V_L$.

To this end, in this case, each of these lines is modeled by a polynomial equation. Here, the chosen polynomial is $3^{rd}$-order, and so it is possible to write:

$$L_{AB} = \int_{x_A}^{x_B} \sqrt{1 + \frac{d(Yline)^2}{dx}} \cdot dx \qquad \text{[Math. 1]}$$

6

In this equation:
the term yLine represents the lateral coordinate of the lane boundary line under consideration,
the term x represents the longitudinal coordinate of this line, and
the terms a, b, c and d are the coefficients of the polynomial, determined on the basis of the shape of the line seen by the frontal camera of the ego vehicle (or acquired by the computer C10 from a navigation system comprising a detailed map of the locations in which the ego vehicle is moving).

In practice, these terms are provided by fusing data. They make it possible to model the shape of the lane boundary lines up to a distance of around one hundred meters when visibility conditions are good.

At this stage, it will be noted that, in the remainder of this disclosure, a term said to be "longitudinal" will correspond to the component of a vector along the abscissa of the reference frame under consideration, and a term said to be "lateral" will correspond to the component of a vector along the ordinate of the reference frame under consideration (the reference frames under consideration here always being orthonormal).

The equation [Math. 1] is expressed here in a reference frame $(X_{EGO}, Y_{EGO})$ tied to the ego vehicle 10 and shown in FIG. 1. This reference frame is oriented such that its abscissa axis extends along the longitudinal axis of the ego vehicle 10. It is centered on the front radar of the ego vehicle 10.

As a variant, other simpler or more complex models of the geometries of the lane boundary lines could be used.

Once the coefficients a, b, c, d have been determined for each lane boundary line, the computer C10 may implement the nine steps of the method that will make it possible to perceive the extent to which the detected objects are hazardous to the ego vehicle in order to trigger, when necessary, the AES obstacle avoidance system.

The first step consists in determining the distance between the ego vehicle and the object under consideration (one of the cars C1, C2).

The distance computed here is not a Euclidean distance. Indeed, it is desired to take into account the shape of the road in order to determine a distance that the ego vehicle 10 and the object will have to cover before hitting one another.

The computer C10 therefore here computes an arc distance $L_{AB}$.

To this end, as detailed for example in document FR3077547, the computer may use the following equation:

$$L_{AB} = \int_{x_A}^{x_B} \sqrt{1 + \frac{d(Yline)^2}{dx}} \, dx \qquad \text{[Math. 2]}$$

where:
$L_{AB}$ is the distance of an arc between two points A and B (corresponding to the positions of the ego vehicle and the object under consideration),
$x_A$ is the longitudinal position of the ego vehicle (at the level of the radar) and
$x_B$ is the longitudinal position of the object under consideration, in the reference frame $(X_{EGO}, Y_{EGO})$.

The second step consists in determining the position of each detected object with respect to the traffic lanes of the road, taking into account the equation of each lane boundary line and the fused data.

The computer C10 knows the coordinates, in the reference frame ($X_{EGO}$, $Y_{EGO}$) tied to the ego vehicle, of a characteristic point of each detected object (hereinafter called "anchor point"). This characteristic point is typically the center of the object seen by the frontal camera or by the radar remote detector. It will be considered here that it is the middle of the radiator grille of the car C1, C2.

In the example of FIG. 1, in which two objects have been detected (the two cars C1, C2), the coordinates of the anchor points are respectively referenced (X_rel1, Y_rel1) and (X_rel2, Y_rel2).

This FIG. 1 also shows the following values on the ordinate axis of the reference frame ($X_{EGO}$, $Y_{EGO}$):

Y_road_NL_1, which is the value of the term yLine from the equation [Math. 1] of the lane boundary line NL, at the abscissa point X_rel1, Y_road_NL_2, which is the value of the term yLine from the equation [Math. 1] of the lane boundary line NL, at the abscissa point X_rel2, Y_road_L_1, which is the value of the term yLine from the equation [Math. 1] of the lane boundary line L, at the abscissa point X_rel1, Y_road_L_2, which is the value of the term yLine from the equation [Math. 1] of the lane boundary line L, at the abscissa point X_rel2, Y_road_R_1, which is the value of the term yLine from the equation [Math. 1] of the lane boundary line R, at the abscissa point X_rel1, Y_road_R_2, which is the value of the term yLine from the equation [Math. 1] of the lane boundary line R, at the abscissa point Xrel2, Y_road_NR_1, which is the value of the term yLine from the equation [Math. 1] of the lane boundary line NR, at the abscissa point X_rel1, Y_road_NR_2, which is the value of the term yLine from the equation [Math. 1] of the lane boundary line NR, at the abscissa point X_rel2.

Then, by comparing these values with the lateral coordinates Y_rel1, Y_rel2 of the cars C1, C2, it is possible to determine the traffic lane in which each of the two cars is located.

By way of example, the lateral coordinate Y_rel1 of the car C1 here is between the values Y_road_R_1 and Y_road_L_1, which means that this car is located between the lane boundary lines L and R.

At this stage, the computer C1 may thus ascertain the traffic lane $V_L$, $V_C$, $V_R$ in which each detected object is located.

The third step aims to determine parameters characterizing the kinematics of each object with respect to the lane boundary lines.

In the remainder of the description of this step, only a single one of these objects (the car C1) will be of interest, for the sake of clarity of the disclosure.

This step comprises a first substep in which the computer C10 determines the position of the object with respect to one of the lane boundary lines. The lane boundary line under consideration is preferably the one separating the central traffic lane from the traffic lane in which the object under consideration is located.

As a variant, the lane boundary line under consideration might be another line, for example a lane edge line (see FIGS. 2 and 3), in particular if no line is detected between the traffic lane of the object and that of the ego vehicle 10.

The idea is that of discretizing an interval of this lane boundary line into a finite number N of points, and then of selecting the one that is closest to the object under consideration. This operation is carried out multiple times by re-discretizing the lane boundary line over an interval that is reduced each time and located on either side of the selected point, in order ultimately to find a good estimate of the point of the traffic lane that is closest to the object under consideration.

Figure 2:
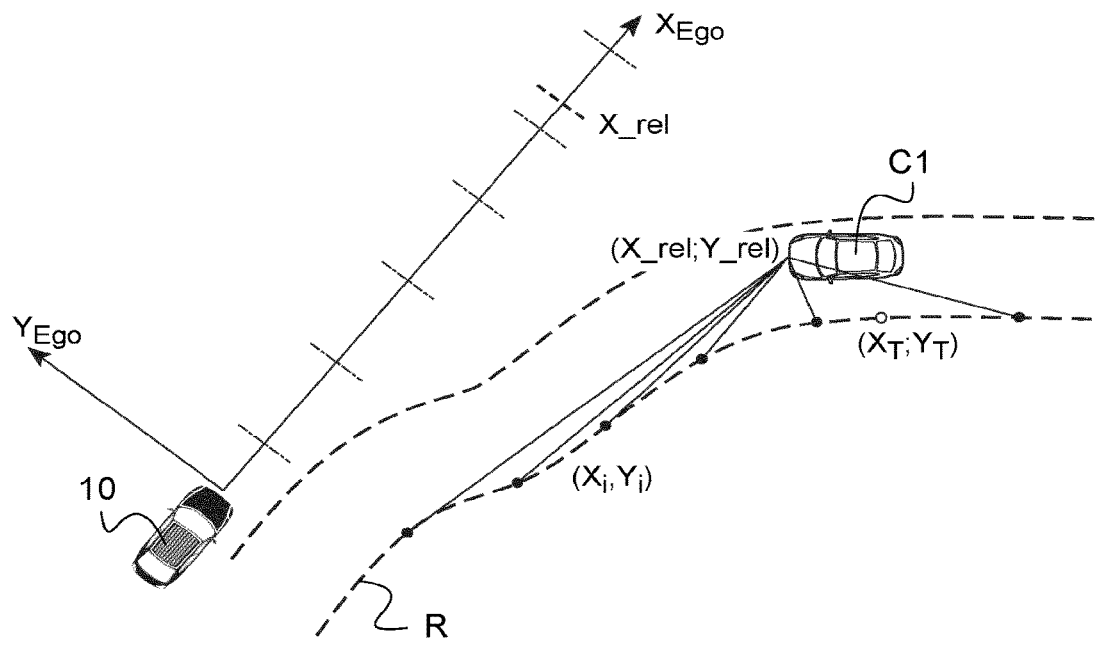
FIG. 2 is a schematic view of the motor vehicle from FIG. 1 and of one of the two target cars.

In practice, as shown in FIG. 2, the computer begins by discretizing the lane boundary line R into N points of coordinates ($X_i$, $Y_i$) in the reference frame of the ego vehicle 10. These points are distributed regularly along this line (in practice, the interval between two consecutive points along the axis $X_{EGO}$ is always the same), a first of the points being located level with the ego vehicle (with a zero abscissa) or at a first predetermined distance therefrom, and the last of the points being located at a second predetermined distance from the ego vehicle.

Next, knowing the coordinates, denoted ($X_{rel}$; $Y_{rel}$) here, of the anchor point of the car C1, the computer is able to deduce therefrom the Euclidean distance $Bird_{Distance}$ between each discretization point of the lane boundary line R and the anchor point of the car C1, using the equation:

$$Bird_{Distance}(X_i, Y_i) = \sqrt{(X_i - X_{rel})^2 + (Y_i - Y_{rel})^2} \qquad \text{[Math. 3]}$$

The discretization point for which the Euclidean distance $Bird_{Distance}$ is smallest is the one closest to the car C1. This point of coordinates ($X_s$, $Y_s$) is therefore selected.

Figure 3:
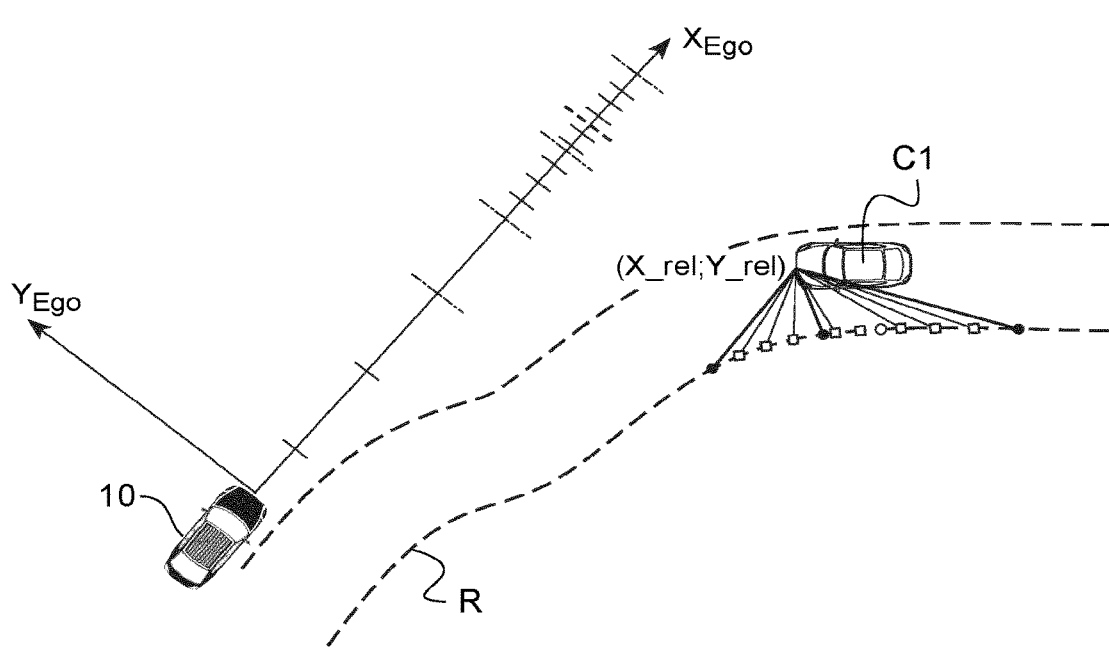
FIG. 3 is a view homologous to that illustrated in FIG. 2, illustrating a second step of the process of determining the position of one of the target cars.

Next, as shown in FIG. 3, this discretization operation is repeated over a smaller interval and with a finer discretization. The bounds of the interval are preferably formed by the points of coordinates ($X_{s-1}$, $Y_{s-1}$) and ($X_{s+1}$, $Y_{s+1}$). The number of discretization points is preferably still equal to N. This new operation then makes it possible to select a new point of coordinates ($X_s$, $Y_s$).

Past a certain number of loops (for example 10) or when the interval between two discretization points is small enough (for example less than 10 cm), the computer stops repeating these operations in a loop.

The last point to have been selected is called "projection point F". It will be considered that this is a good approximation of the point of the boundary line that is closest to the car C1.

The value of the abscissa $X_s$ of this point is called $Distance_{Xproj}$.

The value of the Euclidean distance $Bird_{Distance}$ between the projection point F and the car C1 is called $Dist_{Target2Lane}$.

A second substep consists, for the computer C10, in determining the speed of the ego vehicle in a reference frame tied to the road and located level with this ego vehicle 10, and the speed of the car C1 in a reference frame tied to the road and located level with this car C1.

In this substep, it will be assumed that, from the projection point F, the road follows the tangent at this point. It will therefore be considered to be straight starting from the car C1.

Figure 4:
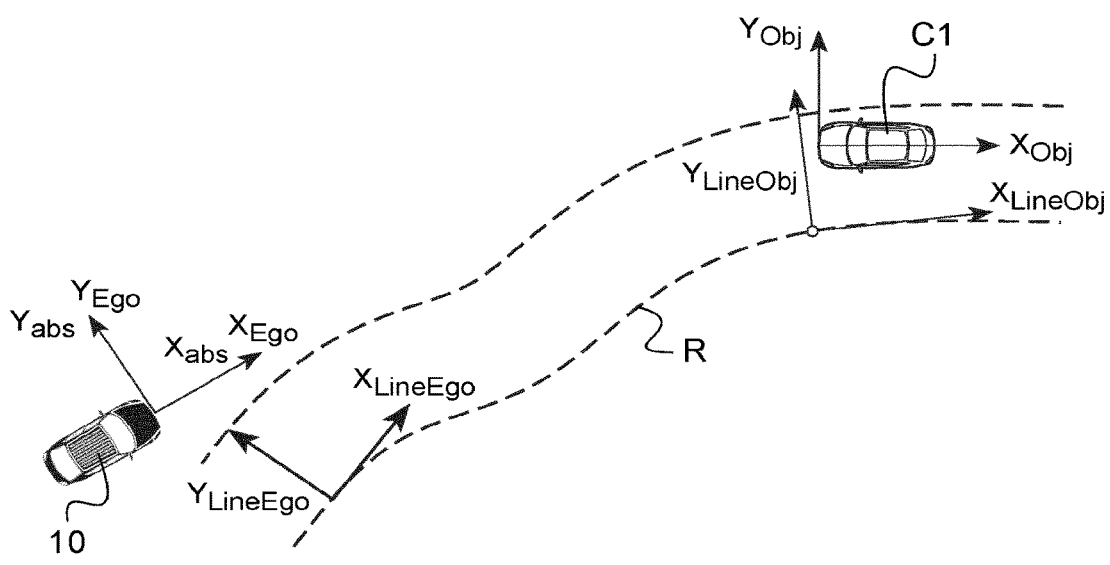
FIG. 4 is a view homologous to that illustrated in FIG. 2, illustrating four reference frames used as part of the invention.

To give a good understanding of the computations, FIG. 4 shows four reference frames used in the remainder of this disclosure.

The first reference frame is the reference frame ($X_{EGO}$, $Y_{EGO}$) that has already been presented, which is tied to the ego vehicle.

It will be noted that this reference frame moves at the same time as the ego vehicle 10. An absolute reference frame ($X_{abs}$, $Y_{abs}$) which is coincident, at the time of the measurements, with the first reference frame but that is considered to be fixed is therefore also shown.

Another reference frame is denoted ($X_{lineEGO}$, $Y_{lineEGO}$); it is tied to the lane boundary line R, is oriented such that its abscissa is tangent to this line, and it is centered on the radar of the ego vehicle (the abscissa of this radar is zero in the second reference frame).

Yet another reference frame is denoted $(X_{obj}, Y_{obj})$; it is tied to the car C1, is oriented such that its abscissa is aligned with the direction of movement of the car C1, and it is centered on the anchor point of this car C1.

A final reference frame is denoted $(X_{LineObj}, Y_{LineObj})$; it is tied to the lane boundary line R, is oriented such that its abscissa is tangent to this line, and it is centered on the anchor point of the car C1.

Figure 5:
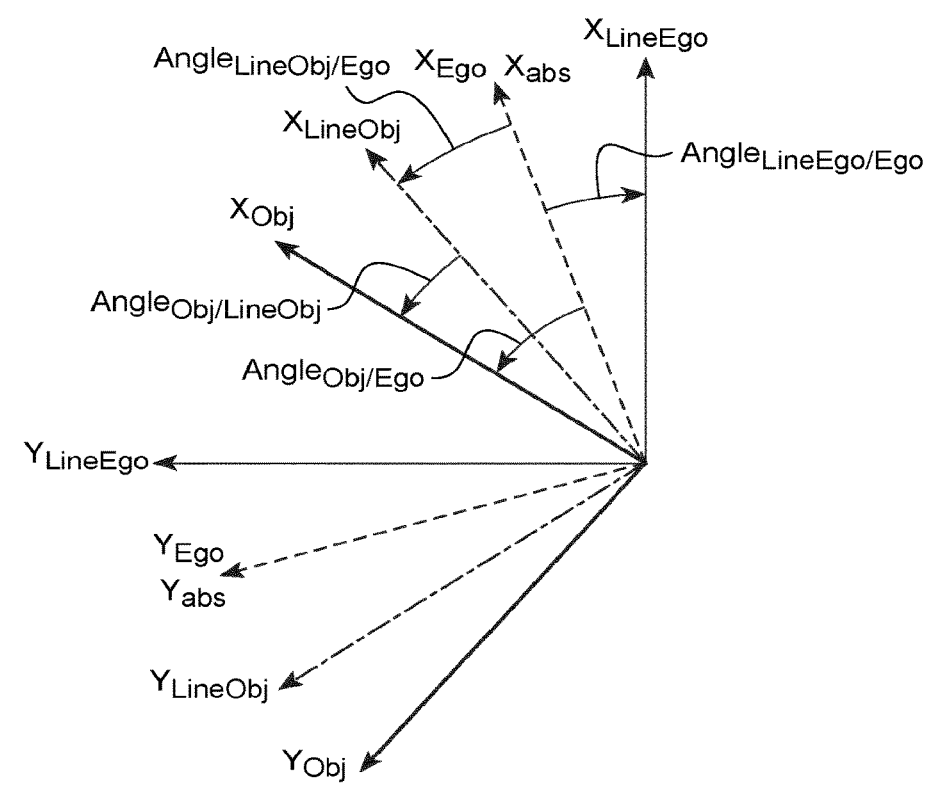
FIG. 5 is a representation of the four reference frames from FIG. 4.

FIG. 5 shows the angles separating these reference frames:

Angle$_{lineEGO/EGO}$ makes it possible to change from the reference frame $(X_{EGO}, Y_{EGO})$ to the reference frame $(X_{lineEGO}, Y_{lineEGO})$, Angle$_{lineObj/EGO}$ makes it possible to change from the reference frame $(X_{EGO}, Y_{EGO})$ to the reference frame $(X_{LineObj}, Y_{LineObj})$, Angle$_{Obj/EGO}$ makes it possible to change from the reference frame $(X_{EGO}, Y_{EGO})$ to the reference frame $(X_{Obj}, Y_{Obj})$, Angle$_{Obj/LineObj}$ makes it possible to change from the reference frame $(X_{LineObj}, Y_{LineObj})$ to the reference frame $(X_{Obj}, Y_{Obj})$.

Angle$_{LineX/EGO}$ will be the name given more generally to the angle separating the abscissa of the reference frame $(X_{EGO}, Y_{EGO})$ and the tangent to the lane boundary line R, at the abscissa point X (expressed in the reference frame $(X_{EGO}, Y_{EGO})$).

It is then possible to write:

$$Angle_{LineX/Ego} = \arctan(d(yLine(x))/dx) \qquad \text{[Math. 4]}$$

with:

$$\frac{d(yline(x))}{dx} = 3.d.x^2 + 2.c.x + b \qquad \text{[Math. 5]}$$

Then, for x=0, it is possible to write:

$$Angle_{LineX/Ego} = Angle_{LineEgo/Ego} = \arctan(b) \qquad \text{[Math. 6]}$$

At the abscissa point x=Distance$_{Xproj}$, it is possible to write:

$$Angle_{Obj/LineObj} = Angle_{Obj/Ego} - Angle_{LineObj/Ego} \qquad \text{[Math. 7]}$$

The computer may compute the longitudinal component $Vx_{EGO/LineEGO}$ and lateral component $Vx_{EGO/LineEGO}$ of the speed of the ego vehicle 10 in the reference frame $(X_{lineEGO}, Y_{lineEGO}$ by way of the following formulae: new formula as follows:

$$Vx_{Ego/LineEgo} = V_{Ego/abs} * \cos(Angle_{V_{Ego}/Ego} - Angle_{LineEgo/Ego}) \qquad \text{[Math. 8]}$$

$$Vy_{Ego/LineEgo} = V_{Ego/abs} * \sin(Angle_{V_{Ego}/Ego} - Angle_{LineEgo/Ego}) \qquad \text{[Math. 9]}$$

In these formulae:

$V_{EGO/abs}$ is the speed of the ego vehicle 10 in the absolute reference frame $(X_{abs}, Y_{abs})$, measured for example by the sensors located on the axles of the vehicle;

Angle$_{VEgo/Ego}$ is the angle of the speed vector of the ego vehicle 10 with respect to the abscissa of the reference frame $(X_{EGO}, Y_{EGO})$. This angle is assumed to be zero here.

The computer may also compute the longitudinal component $Vx_{Obj/abs}$ and lateral component $Vy_{Obj/abs}$ of the speed $V_{Obj/abs}$ of the car C1 in the absolute reference frame. To this end, it uses the following formulae:

$$Vx_{Obj/abs} = Vx_{Obj/Ego} + Vx_{Ego/abs} \qquad \text{[Math. 10]}$$

$$Vy_{Obj/abs} = Vy_{Obj/Ego} + Vy_{Ego/abs} \qquad \text{[Math. 11]}$$

In these formulae:

$Vx_{EGO/abs}$ and $Vy_{EGO/abs}$ are the components of the speed of the ego vehicle 10 along the abscissa and the ordinate of the absolute reference frame $(X_{abs}, Y_{abs})$, and $Vx_{Obj/EGO}$ and $Vy_{Obj/EGO}$ are the components of the speed of the car C1 with respect to the ego vehicle 10 along the abscissa and the ordinate of the reference frame $(X_{EGO}, Y_{EGO})$.

It is then possible to write:

$$V_{obj/abs} = \sqrt{Vx_{Obj/abs}^2 + Vy_{Obj/abs}^2} \qquad \text{[Math. 12]}$$

As shown by the following two equations, it is possible, based on the angles Angle$_{LineObj/Ego}$ and Angle$_{LineEgo/Ego}$, to determine the components $Vx_{Obj/lineObj}$, $Vy_{Obj/lineObj}$ of the relative speed "along the lane boundary line R" of the car C1 with respect to this line at the projection point F, thereby allowing better representativeness of the information.

$$Vx_{Obj/LineObj} = V_{obj/abs} * \cos(Angle_{V_{Obj}/Obj} + Angle_{Obj/Ego} - Angle_{LineObj/Ego}) \qquad \text{[Math. 13]}$$

$$Vy_{Obj/LineObj} = V_{obj/abs} * \sin(Angle_{V_{Obj}/Obj} + Angle_{Obj/Ego} - Angle_{LineObj/Ego}) \qquad \text{[Math. 14]}$$

In these two equations, Angle$_{VObj/Obj}$ is the angle of the speed vector of the car C1 in the reference frame tied to this car, and Angle$_{Obj/Ego}$ is the heading angle of the car in the reference frame $(X_{EGO}, Y_{EGO})$.

In practice, it is assumed here that the speed vector of the object is collinear with its heading angle, such that the angle Angle$_{VObj/Obj}$ is zero.

A similar process is applied to determine the relative accelerations "along the lane boundary line R" between the ego vehicle and this line at the zero abscissa point and between the car C1 and this line at the projection point F.

The computer may thus compute the longitudinal component $Ax_{EGO/LineEGO}$ and lateral component $Ay_{EGO/LineEGO}$ of the acceleration of the ego vehicle 10 in the reference frame $(X_{LineEGO}, Y_{LineEGO})$ by way of the following formulae:

$$Ax_{Ego/LineEgo} = A_{Ego/abs} * \cos(Angle_{V_{Ego}/Ego} - Angle_{LineEgo/Ego}) \qquad \text{[Math. 15]}$$

$$Ay_{Ego/LineEgo} = A_{Ego/abs} * \sin(Angle_{V_{Ego}/Ego} - Angle_{LineEgo/Ego}) \qquad \text{[Math. 16]}$$

The computer may also compute the longitudinal component $Ax_{Obj/LineObj}$ and lateral component $Ay_{Obj/LineObj}$ of the acceleration of the car C1 in the reference frame $(X_{LineObj}, Y_{LineObj})$ by way of the following formulae:

$$Ax_{Obj/LineObj} = A_{obj/abs} * \cos(Angle_{V_{Obj}/Obj} + Angle_{Obj/Ego} - Angle_{LineObj/Ego}) \qquad \text{[Math. 17]}$$

$$Ay_{Obj/LineObj} = A_{obj/abs} * \sin(Angle_{V_{Obj}/Obj} + Angle_{Obj/Ego} - Angle_{LineObj/Ego}) \qquad \text{[Math. 18]}$$

In these formulae:

$A_{EGO/abs}$ is the absolute acceleration of the ego vehicle 10 in the absolute reference frame;

$A_{Obj/abs}$ is the absolute acceleration of the car C1 in the absolute reference frame.

It is then possible to combine the computed speeds and the computed accelerations in order to obtain the longitudinal components $\text{VRelRoute}_{Longi}$, $\text{ARelRoute}_{Longi}$ and lateral components $\text{VRelRoute}_{Lat}$, $\text{ARelRoute}_{Lat}$ of the relative speed and of the relative acceleration of the ego vehicle and of the car C1, in relation to the road being traveled on, using the four equations defined below.

In practice, it will be considered that the longitudinal component $\text{VRelRoute}_{Longi}$ of the relative speed between the ego vehicle and the car C1 is equal to the deviation between the longitudinal component of the speed of the ego vehicle expressed in the reference frame ($X_{LineEGO}$, $Y_{LineEGO}$) tied to the traffic lane at the level of the ego vehicle, on the one hand, and the longitudinal component of the speed of the car C1 expressed in the reference frame ($X_{LineObj}$, $Y_{LineObj}$) tied to the traffic lane at the level of the car C1, on the other hand.

In the same way, it will be considered that the lateral component $\text{VRelRoute}_{Lat}$ of the relative speed between the ego vehicle and the car C1 is equal to the deviation between the lateral component of the speed of the ego vehicle expressed in the reference frame ($X_{LineEGO}$, $Y_{LineEGO}$) tied to the traffic lane at the level of the ego vehicle, on the one hand, and the lateral component of the speed of the car C1 expressed in the reference frame ($X_{LineObj}$, $Y_{LineObj}$l) tied to the traffic lane at the level of the car C1, on the other hand.

It is therefore possible to write:

$$\text{VRelRoute}_{Longi}=Vx_{Obj/LineObj}-Vx_{Ego/LineEgo} \quad\text{[Math. 19]}$$

$$\text{VRelRoute}_{Lat}=Vy_{Obj/LineObj}-Vy_{Ego/LineEgo} \quad\text{[Math. 20]}$$

It is possible to compute the components of the acceleration in a similar manner:

$$\text{ARelRoute}_{Longi}=Ax_{Obj/LineObj}-Ax_{Ego/LineEgo} \quad\text{[Math. 21]}$$

$$\text{ARelRoute}_{Lat}=Ay_{Obj/LineObj}-Ay_{Ego/LineEgo} \quad\text{[Math. 22]}$$

As will become apparent in detail in the remainder of this disclosure, using relative speeds makes it possible to provide indications about the risks of collision that it would be difficult to obtain otherwise.

At this stage, it may be recalled that the computer C10 knows the value of the distance $\text{Dist}_{Target2Lane}$ between the lane boundary line (at the projection point F) and the anchor point of the car C1.

Figure 6:
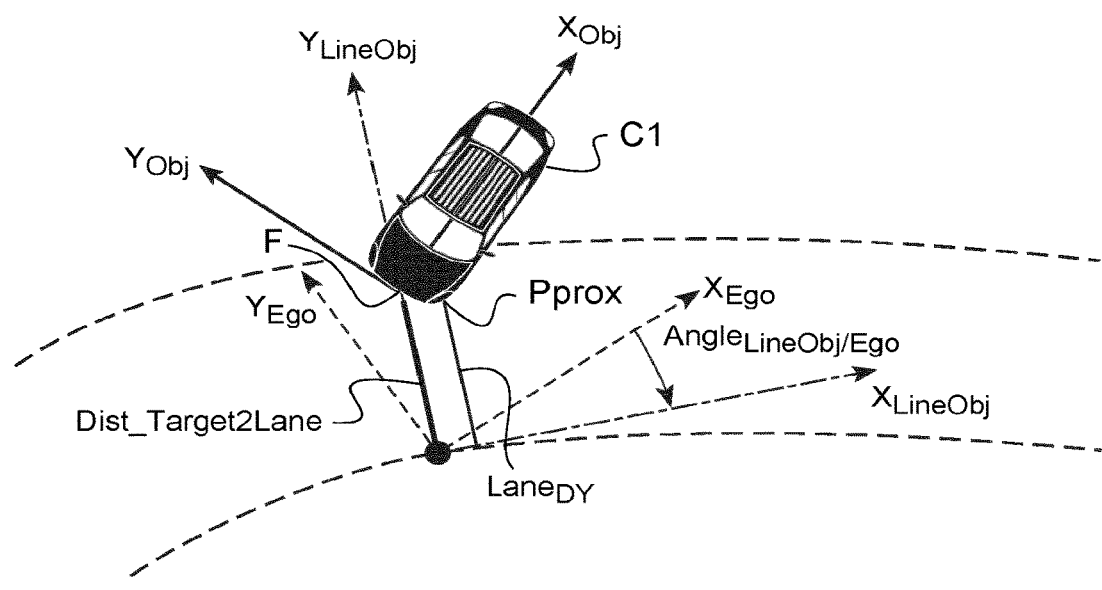
FIG. 6 is a schematic view of one of the target cars from FIG. 1 and of its traffic lane.

In a third substep, the computer C10 will determine the distance $\text{Lane}_{DY}$ between the projection point F and the point $P_{prox}$ of the car C1 closest to the lane boundary line R (see FIG. 6).

It computes this distance here by way of the following equation.

$$\text{Lane}_{DY} = \text{Dist}_{Target2Lane} - \quad\text{[Math. 23]}$$
$$\text{sign}(\text{Dist}_{Target2Lane}) \cdot \frac{\text{Width}}{2}\text{abs}(\cos(\text{Angle}_{Obj/LineObj}))$$

In this equation, the term Width corresponds to the width of the car C1.

The set of computations then makes it possible to determine, in a fourth substep, a time to collision TTC with the object under consideration (the car C1), that is to say the time needed for the ego vehicle to hit the car C1 if they both maintain their speeds.

Indeed, at this stage, the computer knows, from the equation [Math. 2], the length $L_{AB}$ of the arc separating the ego vehicle 10 from the car C1. It also knows, from the equation [Math. 19], the longitudinal component VRelRoute$_{Longi}$ of the relative speed between the ego vehicle 10 and the car C1 referenced to the shape of the road. Finally, it knows, from the equation [Math. 21], the corresponding longitudinal component $\text{ARelRoute}_{Longi}$ of the acceleration.

Using these longitudinal components makes it possible, when the road is curved and the vehicles do not have parallel trajectories, to obtain a good approximation of the time to collision TTC.

Here, the computer C10 then determines the sought time to collision TTC using the following equation:

$$TTC = \frac{-\text{VRelRoute}_{Longi} + \sqrt{\text{VRelRoute}_{Longi}^2 + 2 * \text{ARelRoute}_{Longi} * L_{AB}}}{\text{ARelRoute}_{Longi}} \quad\text{[Math. 24]}$$

It will be noted that two validity conditions of this equation have to be satisfied beforehand. These conditions are as follows.

$$\text{VRelRoute}_{Longi}^2+2*\text{ARelRoute}_{Longi}*L_{AB}\geq0 \text{ and}$$
$$\text{ARelRoute}_{Longi}\neq0 \quad\text{[Math. 25]}$$

On the contrary, if the longitudinal component $\text{ARelRoute}_{Longi}$ of the relative acceleration is zero, it is possible to write:

$$TTC = \frac{L_{AB}}{\text{ARelRoute}_{Longi}} \quad\text{[Math. 26]}$$

As a variant, it would have been possible to compute the time to collision TTC in another way, for example assuming the relative speed and/or the relative acceleration to be constant.

To sum up, at this stage, the computer, by virtue of exploiting the fused data, possesses various parameters characterizing the various objects located in its surroundings and that are also potential obstacles located on its trajectory. It possesses in particular, for each object:

the time to collision TTC (equation [Math. 24]), the position of the object on the road (determined in step 2), and information confirming the existence of the object (provided in the data fusion step).

Then, in a fourth step, the computer C10 will carry out first filtering of the various detected objects on the basis of the parameters that it possesses so as to retain only those that are relevant for implementing the AES function (that is to say those that form potential obstacles).

The filtering operation thus consists in considering that the relevant objects (hereinafter called "targets") are those the existence of which was validated during the data fusion, the position of which is potentially hazardous (in our example, this is tantamount to checking that the objects are located in one of the traffic lanes) and for which the time to collision TTC is less than a predetermined threshold.

If multiple targets are detected in one and the same traffic lane, it is also possible to consider only a limited number of them (for example 4), specifically those for which the distances to the ego vehicle 10 are smallest.

The fifth step consists, for the computer C10, in identifying a lateral trajectory deviation (or overlap) needed to avoid each target or each group of targets to the right and to the left while at the same time avoiding the other objects present on the road.

This step is implemented in five substeps.

Prior to the first substep, the computer C10 identifies each target through a reference specific to this target.

Figure 7:
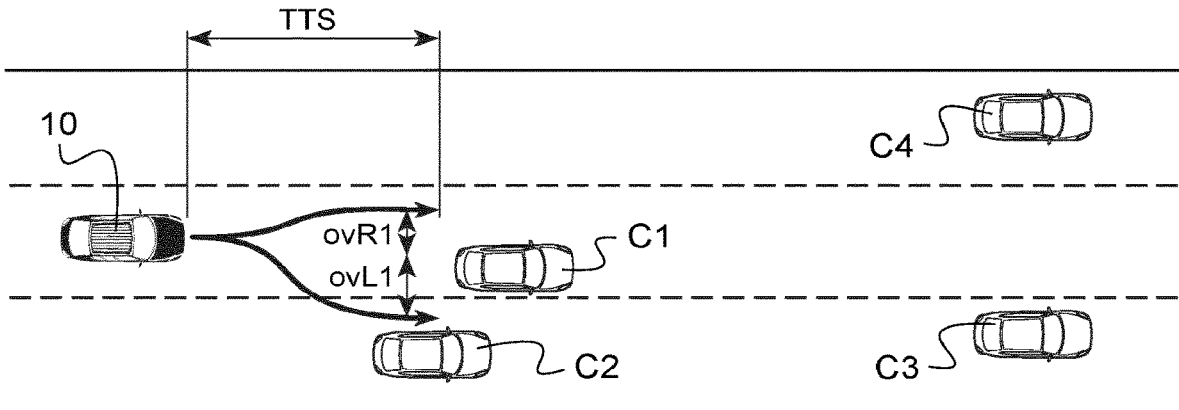
FIG. 7 is a schematic view of one exemplary configuration in which the motor vehicle according to the invention is situated, and four cars traveling in proximity thereto.

FIG. 7 shows one example of a situation in which four targets are located in the surroundings of the ego vehicle 10, ahead thereof.

By way of example, each target is identified by the computer by a reference that is written here in the form Cn, where n is a natural integer here equal to 1, 2, 3 or 4.

The number n of targets Cn is given randomly here.

The first substep consists in considering each target Cn independently and in computing the deviation ovLn needed to avoid this target Cn to the right and the deviation ovRn needed to avoid this target Cn to the left.

The deviations ovL1, ovR1 to be taken to avoid the target C1 have been illustrated in FIG. 7.

These right and left deviations ovLn and ovRn are determined taking into account the trajectory of the ego vehicle 10 and the fused data. Indeed, the data fusion provides kinematic information in relation to the targets with respect to the ego vehicle 10 which, with the trajectory of the ego vehicle, is used to compute these deviations. These deviations are therefore computed dynamically on the basis of the dynamics of the ego vehicle 10, of the dynamics of the targets and of the shape of the lane.

The example of FIG. 7 corresponds to a case in which the ego vehicle 10 and the targets are moving in a straight line.

It is observed therein that if a deviation has to be taken to avoid the target to the right, the value of the deviation ovRn is greater than 0. Otherwise, it is less than or equal to 0. More specifically, if the ego vehicle 10 does not have to change its trajectory to avoid the target while at the same time passing as close as possible thereto, the deviation ovRn is equal to 0. By contrast, if the ego vehicle 10 does not have to change its trajectory to avoid the target but should change it if it wishes to pass as close as possible thereto, the deviation ovRn is strictly less than 0.

In the same way, if a deviation has to be taken to avoid the target to the left, the value of the deviation ovLn is greater than 0. Otherwise, it is less than or equal to 0.

If the road is not straight, it is proposed to refine the computing of these deviations taking into account the following information:

the lateral component VRelRoute Lat of the relative speed between the ego vehicle and the target under consideration, along the road being traveled (equation [Math. 20]), the angle $Angle_{Obj/LineObj}$, and the time to collision TTC.

The first of these items of information makes it possible to take into account the real lateral speed between the ego vehicle 10 and the target, taking into account the shape of the traffic lane.

To gain a good understanding of the benefit of this parameter, consideration may be given to an example in which the ego vehicle and the target are traveling in two separate traffic lanes, in opposing directions, correctly following the curvatures of these two traffic lanes. It will then be understood that, in theory, the risks of an accident are zero. In our example, the lateral component VRelRoute Lat of the relative speed of the ego vehicle with respect to the target will be zero, meaning that the computed deviation will be less than or equal to zero, this correctly expressing the idea of a theoretically zero risk of collision.

In other words, the lateral component $VRelRoute_{Lat}$ and the time to collision TTC make it possible to weight the influence of the relative lateral and longitudinal speeds on the computing of the left and right deviations ovLn, ovRn.

Likewise, the information $Angle_{Obj/LineObj}$ makes it possible to determine a more precise value of the impact surface of the target under consideration, by weighting the length and width of the vehicle.

These right and left deviations $E_{right}$, $E_{left}$ are computed here in a manner homologous to that described in document FR1907351, with the difference that these computations make it possible to take into account the abovementioned three items of information.

The half-width of the target will thus be computed on the basis of the information $Angle_{Obj/LineObj}$. This half-width is then used to compute a preliminary value for each deviation that does not take into account a safety radius to avoid the target. The lateral component $VRelRoute_{Lat}$ is for its part multiplied by the time to collision TTC so as to then be added to this preliminary deviation in order to obtain the desired deviations.

In other words, if considering document FR1907351, to compute the deviations, it will be necessary to use the product of the lateral component $VRelRoute_{Lat}$ and the time to collision TTC in the computation of the lateral coordinate dVy. The coordinate $Y_a$ used in that document (which corresponds here to the coordinate $Y_{rel}$) will for its part be considered equal to the sum of the coordinate resulting from the data fusion and a term equal to the product of the length of the target and the cosine of the angle $Angle_{Obj/LineObj}$.

It is then possible to write:

$$E_{left}=Y_a+er+Long \cdot cos(Angle_{ObjLineObj})+ \\ VRelRoute_{Lat} \cdot TTC \qquad \text{[Math. 27]}$$

In this equation, er is a term for compensating for lateral measurement errors, and Long is the length of the target.

$$E_{right}=Y_a+er-Long \cdot cos(Angle_{ObjLineObj})+ \\ VRelRoute_{Lat} \cdot TTC \qquad \text{[Math. 28]}$$

If the data fusion is used, the term er also takes into account the error resulting from the data fusion. This term is predetermined and stored in a memory of the computer.

The second substep will consist in sorting the targets, in order to rank them in an order that depends on their positions on the road, and more precisely on their deviations to one of the edges of the road.

Here, this operation is carried out on the basis of the computed left deviations $ovL_n$, in descending order. As a variant, it will of course be possible to apply another sorting method.

The benefit of the method used here is that the computing of the deviations takes into account the relative dynamics of the scene, based on the lateral relative speeds of the ego vehicle 10 and of the targets, but also on the computed times to collision TTC, which integrate a concept of predicting the relative positions of the ego vehicle and of the targets.

Figure 8:
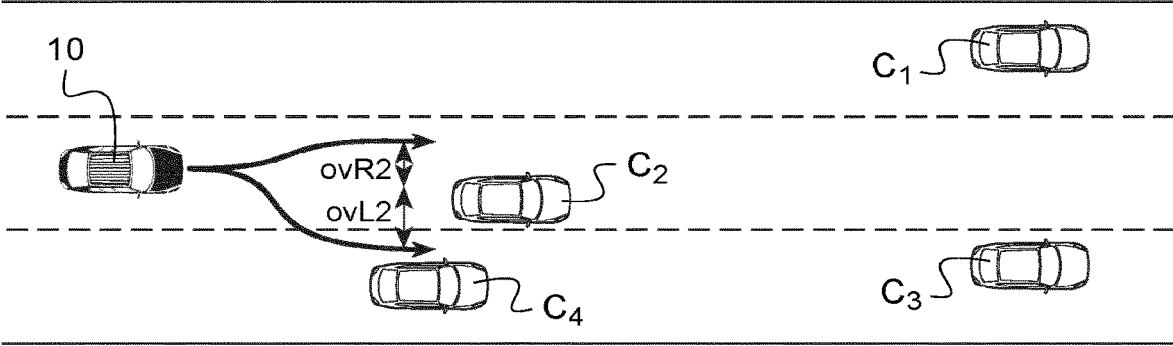
FIG. 8 is a view homologous to that of FIG. 7, in which the references of the cars have been reordered.

Here, as shown in FIG. 8, the targets that were hitherto referenced Cn are now referenced $C_n$.

It may be seen in FIGS. 7 and 8 that:

the target C1 becomes the target $C_2$, the target C2 becomes the target $C_4$, the target C3 becomes the target $C_3$, the target C4 becomes the target $C_1$.

In the same way, the deviations that were referenced ovLn, ovRn are now referenced $ovL_n$, $ovR_n$.

Thus:

the deviations ovL1, ovR1 become $ovL_2$, $ovR_2$, the deviations ovL2, ovR2 become $ovL_4$, $ovR_4$, the deviations ovL3, ovR3 become $ovL_3$, $ovR_3$, the deviations ovL4, ovR4 become $ovL_1$, $ovR_1$.

This classification of the targets makes it possible to rank them from left to right with respect to the ego vehicle 10.

Hereinafter, $TTC_n$ will be used to denote the time to collision computed for the target $C_n$.

Considering each target in succession in the order thus determined, the computer C10 may then determine whether it is possible to pass to the right or to the left of this target.

To this end, in a third substep, the computer solves the following equations (for all values of n ranging from 1 to 4 in our example).

$$Gap_{Left\_n} = -(ovL_n + ovR_{n-1}) - d\text{Safe} \qquad \text{[Math. 29]}$$

$$Gap_{Right\_n} = -(ovR_n + ovL_{n+1}) - d\text{Safe} \qquad \text{[Math. 30]}$$

In these equations, the parameter dSafe has a strictly positive value and corresponds to a safety distance that it is desired to form around the target so as to avoid passing too close thereto. Its value may vary, for example on the basis of the speeds of the target and of the ego vehicle or the traffic conditions (weather, etc.). It is at least equal to the width of the ego vehicle.

The parameter $Gap_{Left\_n}$, hereinafter called left gap, corresponds to the width to pass to the left of the target, taking into account the other targets.

The parameter $Gap_{Right\_n}$, hereinafter called right gap, corresponds to the width to pass to the right of the target, taking into account the other targets.

It will be noted here that the left gap $Gap_{Left\_n}$ is not necessarily computed for n equal to 1, since it is known that it is possible to pass to the left of the target $C_1$.

In the same way, the right gap $Gap_{Right\_n}$ is not necessarily computed for n equal to 4, since it is known that it is possible to pass to the right of the target $C_4$.

At this stage, it may be considered that it is possible for the ego vehicle 10 to pass to the left of the target $C_n$ under consideration if and only if the left gap $Gap_{Left\_n}$ is greater than or equal to zero.

In the same way, it may be considered that it is possible for the ego vehicle 10 to pass to the right of the target $C_n$ under consideration if and only if the right gap $Gap_{Right\_n}$ is greater than or equal to zero.

In the example of FIG. 8, the following are thus obtained:

$Gap_{Right\_1} >$ or $=0$, $Gap_{Left\_2} >$ or $=0$, $Gap_{Right\_2} <0$, $Gap_{Left\_3} <0$, $Gap_{Right\_3} <0$, $Gap_{Left\_4} <0$.

Figure 9:
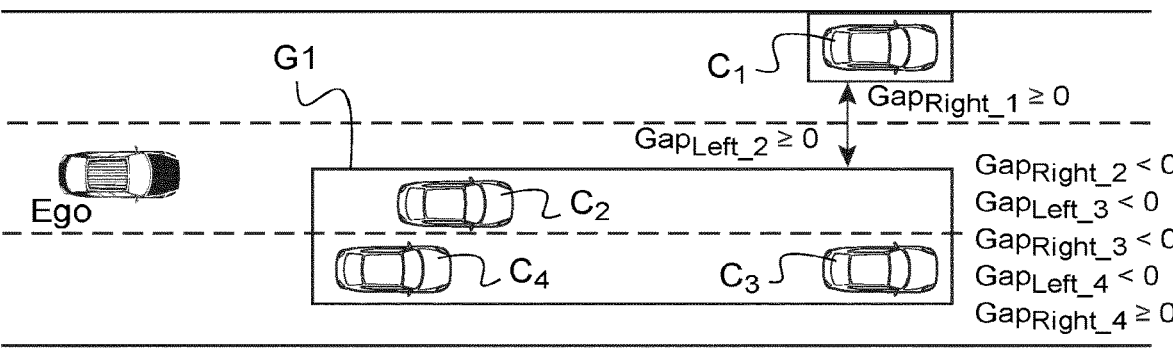
FIG. 9 is a view homologous to that of FIG. 8, in which the cars have been grouped a first time.

This situation is shown in FIG. 9.

It is observed that the values $Gap_{Right\_2}$, $Gap_{Left\_3}$, $Gap_{Right\_3}$, $Gap_{Left\_4}$ are all strictly less than zero, meaning that it is not possible a priori to pass between the targets $C_2$, $C_3$ and $C_4$.

It is also observed that the values $Gap_{Right\_4}$ and $Gap_{Left\_2}$ are greater than or equal to 0, which means that it is possible to pass on either side of this group of targets $C_2$, $C_3$ and $C_4$. It is also possible to pass to the right of the target $C_1$, since the term $Gap_{Right\_1}$ is greater than or equal to 0.

At this stage, the computer may therefore group the targets when it is not possible a priori to pass between them.

To this end, use is made of at least one criterion of proximity between the targets.

A first proximity criterion relates to the lateral distance between the targets.

Thus, to form groups, the computer C10 identifies whether the gap $Gap_{Right\_n}$ or $Gap_{Left\_n+1}$ between a target $C_n$ under consideration and the neighboring target $C_{n+1}$ (in the order of succession) is strictly less than 0. If so, the two targets are grouped.

This thus gives, in the example of FIG. 9, a group of three targets, hereinafter called preliminary group G1.

The combining of the targets into groups of multiple targets may stop there.

However, provision is made here to consider a second proximity criterion to form the groups. This second proximity criterion relates to the longitudinal distance between the targets.

Specifically, the idea is to form a group only if it is not possible for the ego vehicle 10 to fit between some of the targets of the preliminary group G1.

To this end, the computer C10 is programmed here to divide the one or more preliminary groups G1 when they comprise targets spaced longitudinally from one another.

This sorting of the targets within each group is carried out here by comparing the time to collision $TTC_n$ of each target $C_n$. As a variant, this sorting could have been carried out using other parameters (in particular the arc distances $L_{AB}$). The benefit of using this parameter $TTC_n$ here is that it takes into account the relative longitudinal speeds and accelerations of the targets $C_n$.

The computer C10 works in the same way for each group of multiple targets.

It ranks the targets of this group on the basis of their times to collision $TTC_n$, for example in ascending order.

Figure 10:
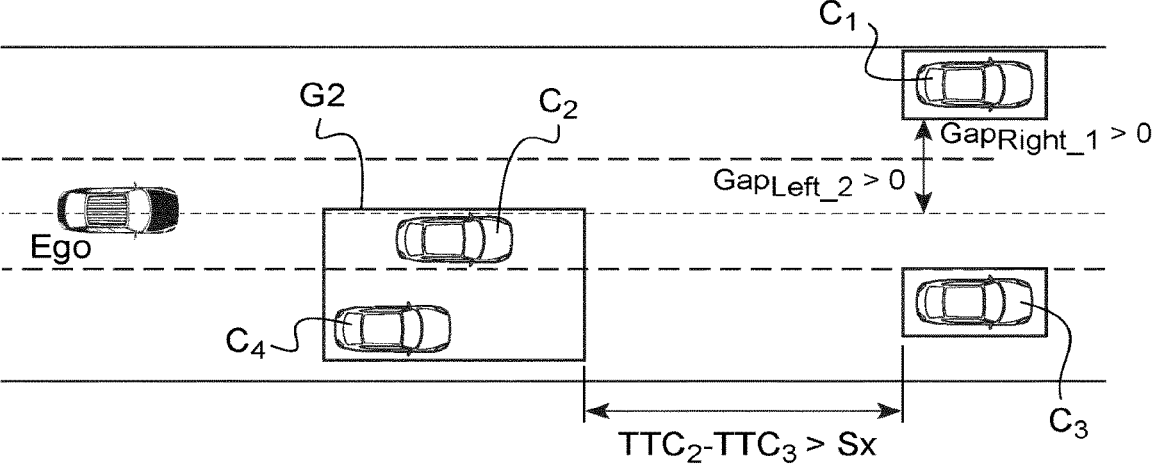
FIG. 10 is a view homologous to that of FIG. 8, in which the cars have been grouped a second time.

In the example of FIG. 10, the targets are then ranked in the following order: $C_4$, $C_2$, $C_3$.

The computer then computes the deviation between each pair of successive targets (in the determined order).

In the example of FIG. 10, it therefore computes:

the deviation $\Delta_{4-2}$ between the time to collision $TTC_4$ associated with the target $C_4$ and the time to collision $TTC_2$ associated with the target $C_2$, the deviation $\Delta_{2-3}$ between the time to collision $TTC_2$ associated with the target $C_2$ and the time to collision $TTC_3$ associated with the target $C_3$.

The computer then compares each of these deviations $\Delta_{4-2}$, $\Delta_{2-3}$ with a threshold Sx.

This threshold might be invariable. However, preferably, it will be chosen on the basis at least of the longitudinal speed of the ego vehicle 10.

If the deviation between the times to collision associated with two successive targets is greater than this threshold, the computer divides the preliminary group into two groups.

In the example of FIG. 10, at the end of this operation, the targets $C_4$ and $C_2$ then form a first group G2, while the target $C_3$ is isolated.

At this stage, the computer will therefore consider each group in the same way as an isolated target. It will therefore associate therewith a left deviation $ovL_i$, a right deviation $ovR_i$, and a time to collision $TTC_i$ (i being the index of the group under consideration).

These parameters are then computed as follows.

Figure 11:
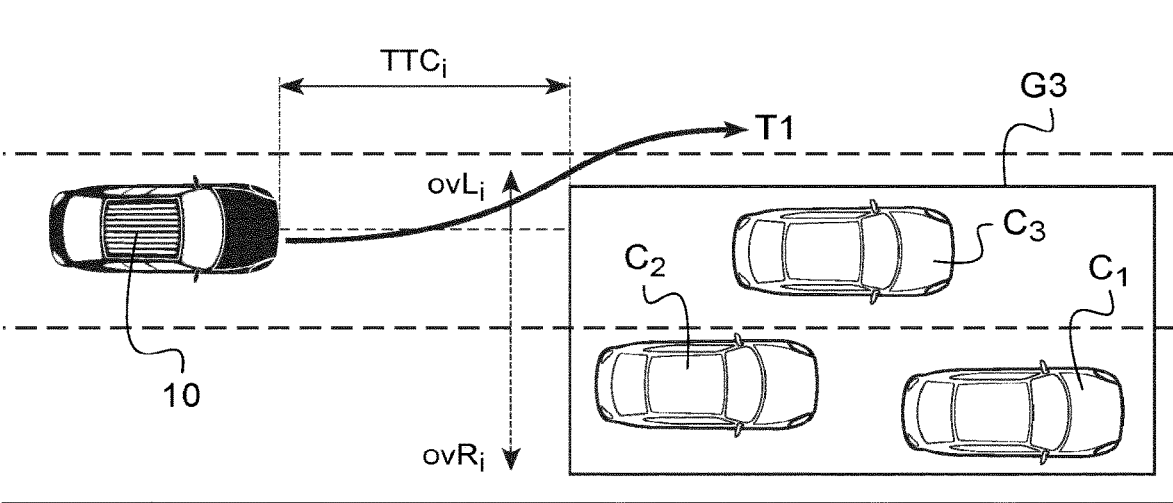
FIG. 11 is a schematic view of another exemplary configuration in which the motor vehicle according to the invention is situated, and a group of three cars traveling in proximity thereto.

For ease of understanding, reference may be made to the example of FIG. 11, in which the group G3 under consideration comprises three targets $C_1$, $C_2$, $C_3$.

The time to collision $TTC_i$ of the group will be chosen to be equal to the smallest time to collision $TTC_n$ out of the times to collision $TTC_n$ of the targets $C_1$, $C_2$, $C_3$ of the group.

The left deviation $ovL_i$ of the group will be chosen to be equal to the largest left deviation $ovL_n$ out of the left deviations $ovL_n$ of the targets of the group.

The right deviation $ovR_i$ of the group will be chosen to be equal to the largest right deviation $ovR_n$ out of the right deviations $ovR_n$ of the targets of the group.

In the remainder of this disclosure, for simplicity, the generic term "target" will be used to designate both a group of multiple targets and a single target not forming part of any group.

The sixth step consists, for the computer, in carrying out second filtering among the targets, in order to distinguish those that are critical from the others.

A target will be said to be critical if it requires activation of the AES function in order to be avoided. The most critical target (target MCT) is the one requiring the earliest activation of the AES function.

A target will be said to be "medium-risk" if its position is such that it should be taken into account when determining the avoidance trajectory to be followed. Thus, a medium-risk target is liable to inhibit the activation of the AES function.

The idea is to successively consider each detected target independently (and therefore independently of its surroundings).

To begin with, the computer C10 considers that all of the targets located in the traffic lane of the ego vehicle 10 are critical.

With regard to targets located in the lanes adjacent to that being traveled in by the ego vehicle 10, the computer checks whether they comply with additional criteria.

Here, these criteria are related to the following parameters:

the arc distance $L_{AB}$, the distance $Lane_{DY}$ between the projection point F and the point of the target closest to the lane boundary line (equation [Math. 23]), and the lateral component $Vy_{Obj/lineObj}$ of the speed of the target with respect to the lane boundary line at the projection point F (equation [Math. 14]).

Figure 12:
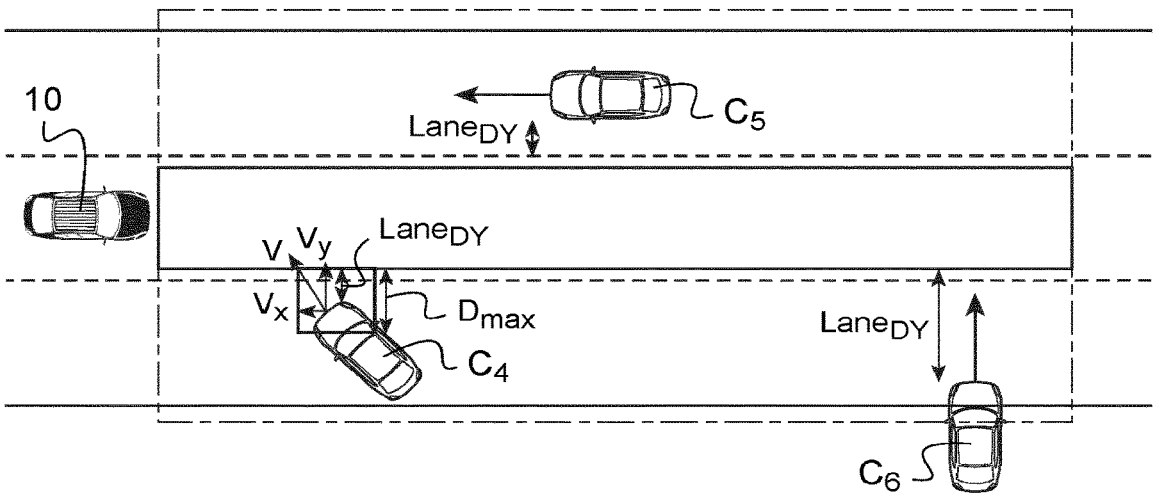
FIG. 12 is a schematic view of another exemplary configuration in which the motor vehicle according to the invention is situated, and three cars traveling in proximity thereto.

FIG. 12 shows three targets C4, C5, C6 located in two lanes adjacent to the one being traveled in by the ego vehicle 10.

To determine whether or not each target is critical, the computer checks whether the following two conditions i) and ii) are met.

To check the first condition i), the computer begins by computing the distance $Lane_{DY}$ between the target and the lane boundary line under consideration (equation [Math. 23]). This makes it possible to ascertain whether the target is relatively close or by contrast far from the lane boundary line under consideration.

The computer C10 deduces therefrom a minimum lateral speed threshold, denoted $Vy_{thresholdMin}$.

Next, if the component $Vy_{Obj/lineObj}$ exceeds the minimum threshold $Vy_{thresholdMin}$, then the first condition (to consider the target as critical) is met. If not, the target is simply considered to be medium-risk.

It will be noted that the threshold that is used is therefore a variable that depends on the distance between the target and the lane boundary line under consideration, thereby making it possible to take into account the fact that the smaller this distance, the greater the risk of collision.

The threshold that is used may furthermore depend on the way in which the target was characterized in the previous time increment (critical or non-critical). Specifically, the idea is that the characterization of the target does not vary in each time increment, due to noise in the measurements of the data to be fused. To this end, the threshold used for the target to change from non-critical to critical is higher than that used for the target to change from critical to non-critical (like a hysteresis function).

The second condition ii) makes it possible not to take into account targets resulting from possible perception errors, along with those having excessively large or aberrant lateral speeds. To this end, the computer compares the absolute value of the lateral component $Vy_{Obj/lineObj}$ with a predetermined maximum threshold $Vy_{thresholdMax}$. If this component is greater than the maximum threshold, the second condition is not met and the target is considered to be medium-risk. The maximum threshold should be restrictive so as not to consider false detections, which sometimes have unreasonable values.

This maximum threshold is preferably greater than 2 m/s, preferably equal to 3 m/s.

Targets that do not meet one and/or the other of conditions i) and ii) are considered to be medium-risk targets. The other targets are considered to be critical.

Classifying the perceived targets into critical targets and medium-risk targets makes it possible to reduce computing times. Moreover, this classification of the targets simplifies the decision on whether or not to activate the AES system, and the decision that is made may be justified to a human driver.

In FIG. 12, it may be considered that only the target C4 meets the two conditions i) and ii), since neither of the other two targets meets condition i).

The seventh step consists, for the computer C10, in determining, for each critical target, a critical time Tcrit that integrates two separate items of information that are relevant for guaranteeing obstacle avoidance while minimizing the intrusive character of the AES function for the driver.

The benefit of computing this parameter is in particular that of making it possible to find which target is the most critical target MCT among the critical targets.

Before describing how this parameter is obtained, it may be recalled that the AES avoidance system may be operated fully automatically (in which case the avoidance trajectory is followed autonomously by the assisted steering actuator) or semiautomatically (in which case the avoidance is carried out manually by the driver, the assisted steering actuator being controlled so as to assist the driver with following an avoidance trajectory once the driver has triggered the avoidance). In the remainder of the description, reference is made to an autonomous mode and a manual mode to respectively designate these two methods.

Avoidance in manual mode is potentially less effective than avoidance in autonomous mode. The avoidance trajectory computed by the AES system will thus not be the same in manual mode and in autonomous mode. It will be noted that the computing of this avoidance trajectory (in the form of a clothoid) is not the subject of the present invention. It may simply be recalled that the shape of this trajectory is computed on the basis of the dynamic performance of the vehicle and the capabilities of the driver (in manual mode).

Whatever the case, taking into account the computed deviations $ovL_n$, $ovR_n$, it is possible to construct four avoidance trajectories (four clothoids) in order to avoid the critical target to the right and to the left, in manual mode and in autonomous mode.

These clothoids have curvatures that depend on the maximum dynamic capabilities of the vehicle. The shape of these clothoids is then read from a database, on the basis of the speed of the ego vehicle 10.

Taking into account these deviations and the determined avoidance trajectories, it is possible to deduce therefrom four maneuvering times TTS (see FIG. 7) that correspond to the time needed, in each mode, to carry out the avoidance maneuver to the left or to the right.

The way in which these maneuvering times TTS are obtained will not be described here since it will depend on the dynamic characteristics of the ego motor vehicle 10 and on the performance of the driver. In practice, these maneuvering times TTS might be read from a database established using a test battery.

Knowing the time to collision $TTC_n$ and the maneuvering time TTS for each critical target, the computer may deduce therefrom the critical time Tcrit using the formula:

$$\text{Tcrit}=TCC-TTS \qquad \text{[Math. 31]}$$

This critical time therefore becomes zero at the last moment when it is still possible to activate the AES function and to avoid the collision with the critical target under consideration, in the manual or automatic mode under consideration, by avoiding it on the side under consideration.

This critical time Tcrit thus carries three essential items of information about the target under consideration: the side on which to avoid it, the performance of the system (and of the driver) and the time to collision $TTC_n$ with the target.

The eighth step will then consist in using the computed critical times Tcrit to classify the critical targets and find the most critical target MCT.

If the driver is in control of the maneuver in manual mode (for example because the autonomous mode was not able to be activated), the computer selects the critical target for which the critical time is smallest in the case of avoidance to the right and that for which the critical time is smallest in the case of avoidance to the left.

Next, as soon as the computer C10 detects that the driver is initiating an avoidance maneuver, it may decide to activate the AES system to assist the driver in their maneuver on the basis of the two selected critical times.

To this end, the computer determines the side to which the driver is turning the steering wheel when they start their avoidance maneuver (to the right or to the left), and it then selects, out of the two selected critical times, the one corresponding to the side on which the driver has started their avoidance maneuver.

The most critical target MCT is the one corresponding to the chosen critical time.

In autonomous mode, the computer acts differently. Indeed, it is necessary to determine the side on which the ego vehicle 10 should avoid the one or more obstacles.

The idea is then to determine, for each critical target, the best side to avoid it and then to determine the most critical target MCT.

In practice, the computer selects, for each critical target, the side for which the critical time Tcrit is highest.

It then chooses, out of the critical times thus selected, the one that is smallest.

The computer then considers that the most critical target MCT is the one whose critical time Tcrit has been chosen.

The ninth step consists, for the computer C10, in triggering the AES function if necessary and at the optimum moment.

In this case, in autonomous mode, the AES function is triggered as soon as the chosen critical time Tcrit drops below a predetermined threshold, for example equal to 0 seconds.

By contrast, in manual mode, this AES function is triggered differently.

The idea is to trigger the AES function and to accompany the driver in the avoidance in a way that is tailored to the situation.

Indeed, if the driver initiates turning of the steering wheel too early, their maneuver will be considered to be non-urgent as the situation does not require an action from the driver of this type at this time. The AES system will then not be activated.

Likewise, if a collision is imminent and if the autonomous mode was not able to be activated before, then it may be considered that it will be too late for the AES system to be able to provide any assistance to the driver. It will then hand over responsibility to another safety system to minimize the impact.

Thus, in manual mode, it will be necessary to determine a time interval during which, if an avoidance action performed by the driver is detected, the AES system will be activated.

This time interval will be delimited by two bounds.

The first bound, starting from which, if the driver initiates an avoidance maneuver, they will be assisted, will correspond to a critical time Tcrit strictly greater than 0.

The second bound, starting from which it will be considered that it is too late to trigger the AES system, corresponds to a critical time Tcrit less than or equal to 0, and preferably strictly less than 0.

Thus, to activate the AES function, the computer determines whether the chosen critical time Tcrit is between these two bounds, and it activates the AES function only if this is the case.

The present invention is in no way limited to the embodiments described and shown, but a person skilled in the art will know how to provide any variant thereto according to the invention.

Consideration could have been given to a single proximity criterion that is neither lateral nor longitudinal, but that considers only the deviation between the targets.

As another variant, the first step could have been grouping the vehicles according to their longitudinal deviations, and then dividing each group thus obtained as necessary according to the lateral deviations between the vehicles of the group.

The invention claimed is:

1. An avoidance method for avoiding objects for a motor vehicle, comprising:

detecting objects located in surroundings of the motor vehicle, acquiring data characterizing a position or dynamics of each detected object, wherein, when multiple objects have been detected, the avoidance method further comprises:

checking whether at least one criterion of proximity between at least two of the detected objects is met, and when the at least one criterion is met, combining the two objects into a group, computing data characterizing the position or the dynamics of said group, and activating an obstacle avoidance system or determining an avoidance trajectory according to the data characterizing the position or the dynamics of said group, wherein said proximity criterion relates to a lateral distance between the two objects, wherein, in the acquiring, one of the data is a lateral trajectory deviation that the motor vehicle has to take in order to avoid each object, and wherein the proximity criterion includes checking whether a difference between the lateral trajectory deviation to be taken to avoid a first of the two objects on a side oriented toward the second object and the lateral trajectory deviation to be taken to avoid the second object on a side oriented toward the first object is greater than or equal to a predetermined threshold, the method further comprising:

ranking, when at least three objects have been detected, the objects in an order of succession from a first lateral edge of the road to a second lateral edge of the road that is opposite to the first lateral edge of the road, and checking whether the proximity criterion is met between each pair of successive objects in said order of succession.

2. The avoidance method as claimed in claim 1, wherein provision is made to compute a relative lateral speed based on a deviation between a lateral speed of the motor vehicle with respect to the road on which it is traveling in a first reference frame oriented along a tangent to the road at the level of the motor vehicle and a lateral speed of the object with respect to the road in a second reference frame oriented along a tangent to the road at the level of said object, and wherein each lateral trajectory deviation is determined based on a relative lateral speed.

3. The avoidance method as claimed in claim 1, wherein, in the acquiring, one of the data is a lateral trajectory deviation to be taken to avoid each object on one and the same left or right side, and wherein, in the computing, one of the data characterizing the group is chosen to be equal to a largest of the lateral trajectory deviations to be taken to avoid each object of the group on a same side.

4. The avoidance method as claimed in claim 1, wherein, in the acquiring, one of the data characterizing each object is a remaining time before the motor vehicle hits each object, and wherein, in the computing, one of the data characterizing the group is chosen to be equal to a smallest of the remaining times before the motor vehicle hits each object of the group.

5. A motor vehicle comprising:

at least one steered wheel, a steering system for each steered wheel configured to be maneuvered by an actuator controlled by at least one processor, wherein the at least one processor is configured to, detect objects located in surroundings of the motor vehicle, acquire data characterizing a position or dynamics of each detected object, wherein, when multiple objects have been detected, the at least one processor is further configured to:

check whether at least one criterion of proximity between at least two of the detected objects is met, and when the at least one criterion is met, combine the two objects into a group, compute data characterizing the position or the dynamics of said group, and activate an obstacle avoidance system or determining an avoidance trajectory according to the data characterizing the position or the dynamics of said group, wherein said proximity criterion relates to a lateral distance between the two objects, wherein, one of the data is a lateral trajectory deviation that the motor vehicle has to take in order to avoid each object, and wherein the proximity criterion includes checking whether a difference between the lateral trajectory deviation to be taken to avoid a first of the two objects on a side oriented toward the second object and the lateral trajectory deviation to be taken to avoid the second object on a side oriented toward the first object is greater than or equal to a predetermined threshold, the at least one processor is further configured to:

rank, when at least three objects have been detected, the objects in an order of succession from a first lateral edge of the road to a second lateral edge of the road that is opposite to the first lateral edge of the road, and check whether the proximity criterion is met between each pair of successive objects in said order of succession.

6. The motor vehicle as claimed in claim 5, wherein provision is made to compute a relative lateral speed based on a deviation between a lateral speed of the motor vehicle with respect to the road on which it is traveling in a first reference frame oriented along a tangent to the road at the level of the motor vehicle and a lateral speed of the object with respect to the road in a second reference frame oriented along a tangent to the road at the level of said object, and wherein each lateral trajectory deviation is determined based on a relative lateral speed.

7. The motor vehicle as claimed in claim 5, wherein an additional proximity criterion relates to a longitudinal distance between the two objects.

8. The motor vehicle as claimed in claim 7, wherein, one of the data relates to a remaining time before the motor vehicle hits each object, and wherein, to check that said additional proximity criterion is met, the at least one processor is configured to check whether the deviation between the times to collision with the two objects is less than a threshold.

9. The motor vehicle as claimed in claim 5, wherein, one of the data is a lateral trajectory deviation to be taken to avoid each object on one and the same left or right side, and wherein, one of the data characterizing the group is chosen to be equal to a largest of the lateral trajectory deviations to be taken to avoid each object of the group on a same side.

10. The motor vehicle as claimed in claim 5, wherein, one of the data characterizing each object is a remaining time before the motor vehicle hits each object, and wherein, one of the data characterizing the group is chosen to be equal to a smallest of the remaining times before the motor vehicle hits each object of the group.

* * * * *